United States Patent
Hsu

(10) Patent No.: US 8,202,452 B2
(45) Date of Patent: Jun. 19, 2012

(54) MOLD FOR PROCESSING OPTICAL FILM AND MANUFACTURING METHOD THEREOF

(75) Inventor: Chia-Ling Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/943,018

(22) Filed: Nov. 10, 2010

(65) Prior Publication Data

US 2012/0068047 A1 Mar. 22, 2012

(30) Foreign Application Priority Data

Sep. 21, 2010 (TW) .............................. 99131901 A

(51) Int. Cl.
*B28B 7/36* (2006.01)
*B29D 11/00* (2006.01)
(52) U.S. Cl. .......... 264/2.5; 264/2.6; 264/219; 427/135; 427/162

(58) Field of Classification Search .................. 264/1.1, 264/2.5, 2.6, 132, 219, 233; 427/133, 135, 427/162; 425/808, 810
See application file for complete search history.

(56) References Cited

U.S. PATENT DOCUMENTS

| 4,775,554 A | * | 10/1988 | Ponjee | 427/133 |
| 5,198,414 A | * | 3/1993 | Ovshinsky et al. | 505/461 |
| 7,303,936 B2 | * | 12/2007 | Chilcott | 438/50 |

* cited by examiner

*Primary Examiner* — Mathieu D. Vargot
(74) *Attorney, Agent, or Firm* — Altis Law Group, Inc.

(57) ABSTRACT

A mold for processing optical film includes a substrate, a copper oxide film, and a hydrophobic fluorinated self-assembled monolayer film. The substrate has a copper surface. The copper oxide film is formed on the copper surface. The hydrophobic fluorinated self-assembled monolayer film is formed on the surface of the copper oxide film. The mold provides easy release of the hydrophobic fluorinated self-assembled monolayer film.

7 Claims, 2 Drawing Sheets

MOLD FOR PROCESSING OPTICAL FILM AND MANUFACTURING METHOD THEREOF

BACKGROUND

1. Technical Field

The disclosure relates to molds, and particularly to a mold for processing optical film.

2. Description of the Related Art

While LCD (liquid crystal display) is important and popular as a display technology, because the liquid crystal does not illuminate itself, backlight modules are commonly required.

An optical film is a component of the backlight module. One of key technologies of the backlight module is manufacture of the optical film. The main function of the optical film is utilization of the microstructure of the optical film to change the path of light and increase brightness, range, and the uniformity of illumination.

In common use, a UV glue is coated on the substrate, and then embossed, utilizing a roller having a microstructure to impress and transform the microstructure on the substrate. Finally, the microstructure of the optical film is cured with the UV light. Frequently, mold release is an important and difficult stage of the process, and accompanying remnants of UV glue can generate defects in the optical film and affect the shape of subsequently molded optical film.

Therefore, it is desirable to provide a mold for processing optical film which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present mold for processing optical film. Moreover, in the drawings, like reference numerals designate corresponding parts throughout the views.

DETAILED DESCRIPTION

Embodiments of a mold for processing optical film as disclosed are described in detail here with reference to the drawings.

Figure 1:
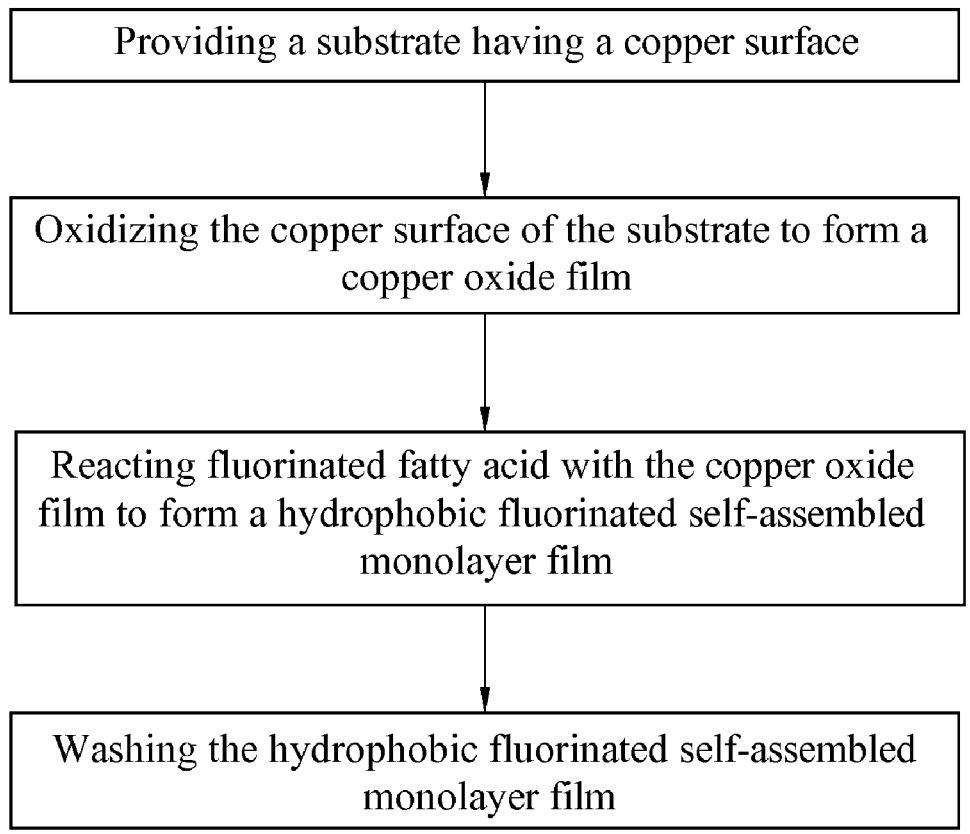
FIG. 1 is a flow chart of a manufacturing method for a mold in accordance with a first embodiment.
Figure 2:
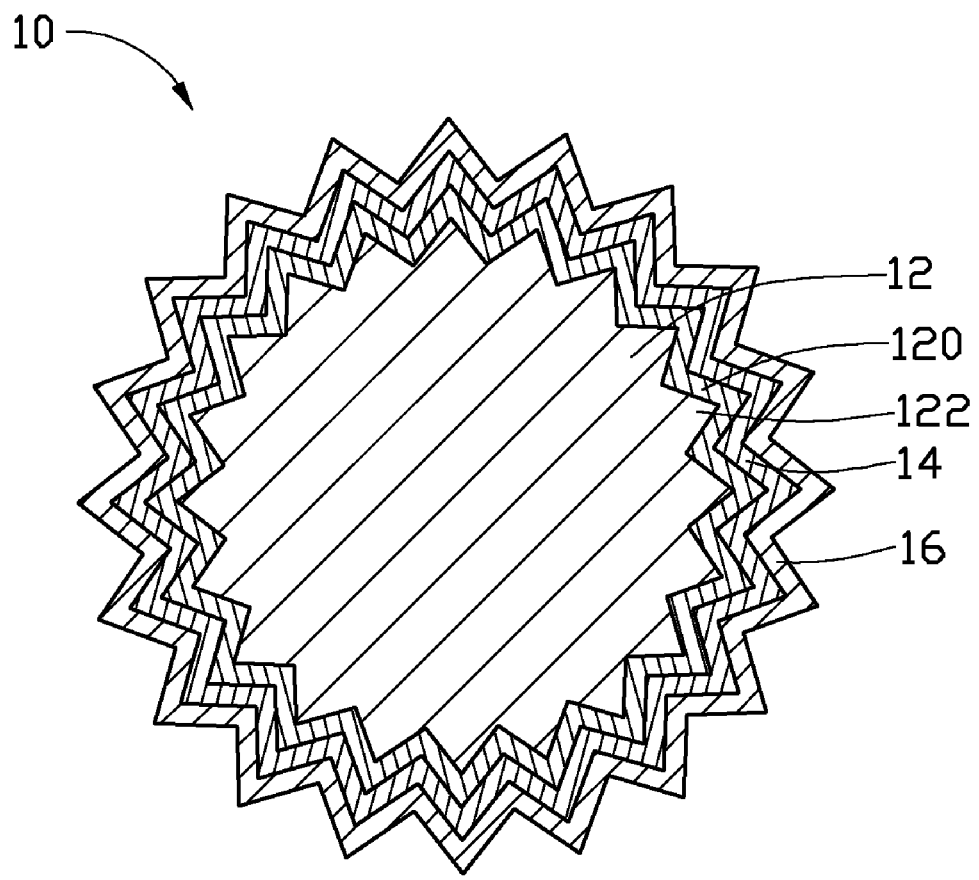
FIG. 2 is a schematic view of a mold in accordance with a first embodiment.

Referring to FIGS. 1 and 2, a method for manufacturing a mold 10 for processing optical film includes providing a substrate 12 having a copper surface 120, oxidizing the copper surface 120 of the substrate 12 to form a layer of copper oxide film 14, reacting fluorinated fatty acid with the copper oxide film 14 to form a hydrophobic fluorinated self-assembled monolayer film 16, and washing the hydrophobic fluorinated self-assembled monolayer film 16.

The substrate 12 having a copper surface 120 can be a copper roller, or be another shape. The surface of the substrate 12 forms a microstructure 122 utilized to create a pattern on the optical film of the substrate 12.

In the second step, the substrate 12 may be oxidized and heated in an oxygen or atmosphere environment. To increase the oxidation rate, the substrate 12 can be oxidized in oxygen plasma and then washed with deionized water. Due to the copper oxide film 14 formed on the surface 120 of the substrate 12, the hydrophobic fluorinated self-assembled monolayer film 16 can be formed easily.

Reaction of fluorinated fatty acid with the copper oxide film can further comprise placement of substrate 12 having the copper oxide film 14 into a hermetically sealed container with nitrogen environment, and addition of perfluorinated fatty acid with a long linear carbon chain into the container at a concentration of 0.2% of volume of the container. In this embodiment, the perfluorinated fatty acid with a long linear carbon chain is $CF_3(CF_2)_n COOH$, wherein n is 3, 6, 8, 10, or 16.

The container is heated to 200° C. and maintained for three hours to vaporize the perfluorinated fatty acid, hermetically covering the substrate 12. Chemical adsorption occurs between a carboxyl group of the vaporized perfluorinated fatty acid and the copper oxide film 14 of the substrate 12 and dehydration reaction occurs between the carboxyl group of the vaporized perfluorinated fatty acid and the copper oxide film 14 of the substrate 12. Thus, the fluorinated self-assembled monolayer film 16 is formed on the substrate 12. Because the perfluorinated fatty acid has C—F bonding, the fluorinated self-assembled monolayer film 16 is hydrophobic. The temperature of dehydration can be any temperature higher than the vaporizing temperature of the perfluorinated fatty acid.

The perfluorinated fatty acid with long linear carbon chain can be replaced with partial fluorinated fatty acid with long linear carbon chain, such as CF3(CF2)n(CH2)mCOOH, wherein n+m is 3, 6, 8, 10, or 16, and n and m are both integers.

The substrate 12 is cooled.

Chloroform, acetone, alcohol, and deionized water are sequentially employed to wash the surface of the mold 10 and remove remaining fluorinated fatty acid.

Referring to FIG. 2, the mold 10 for processing optical film in accordance with a first embodiment includes a substrate 12 having a copper surface 120, a copper oxide film 14 formed on the copper surface 120, and a fluorinated self-assembled monolayer film 16 formed on the copper oxide film 14.

The substrate 12 is a copper roller in this embodiment, and the substrate 12 can be other shape. The surface of the substrate 12 forms a microstructure 122 utilized to create a pattern on an optical film. In this embodiment, the microstructure 122 is with V-shape recession extending along axis of the copper roller.

The fluorinated self-assembled monolayer film 16 is formed by dehydration reaction of the copper oxide film 14 and perfluorinated fatty acid (CF3(CF2)nCOOH), wherein n is 3, 6, 8, 10, or 16, or partial fluorinated fatty acid (CF3(CF2)n(CH2)mCOOH), wherein n+m is 3, 6, 8, 10, or 16, and n and m are both integers. The fluorinated self-assembled monolayer film 16 is highly hydrophobic.

The disclosure provides a mold 10 for processing optical film having a highly hydrophobic fluorinated self-assembled monolayer film 16 which is easily released from the mold 10. Furthermore, the hydrophobic fluorinated self-assembled monolayer film 16 provides a protective layer protecting the mold from oxidization and avoiding optical defects on the surface of the mold 10.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for manufacturing a mold for processing optical film, including steps of:
   providing a substrate in the form of a copper roller, the substrate having a copper surface, the copper surface comprising a plurality of microstructures, the microstructures defining a plurality of V-shaped recesses each extending parallel to an axis of the copper roller;
   oxidizing the copper surface of the substrate to form a copper oxide film; and
   dehydrating the copper oxide film with fluorinated fatty acid to form a fluorinated self-assembled monolayer film on a surface of the copper oxide film.

2. The method for manufacturing a mold for processing optical film of claim 1, wherein the copper oxide film is formed on the copper surface of the substrate by oxygen plasma treatment.

3. The method for manufacturing a mold for processing optical film of claim 2, wherein the dehydration reaction occurs in an enclosed nitrogen environment.

4. The method for manufacturing a mold for processing optical film of claim 3, wherein the temperature of the dehydration reaction is higher than the vaporization temperature of the fluorinated fatty acid.

5. The method for manufacturing a mold for processing optical film of claim 4, wherein the fluorinated fatty acid is a perfluorinated fatty acid with a long linear carbon chain ($CF_3(CF_2)_nCOOH$), and n is 3, 6, 8, 10, or 16.

6. The method for manufacturing a mold for processing optical film of claim 4, wherein the fluorinated fatty acid is a partial perfluorinated fatty acid with a long linear carbon chain ($CF_3(CF_2)_n(CH_2)_mCOOH$), wherein n+m is 3, 6, 8, 10, or 16, and n and m are both integers.

7. The method for manufacturing a mold for processing optical film of claim 4, further comprising washing the surface of the fluorinated self-assembled monolayer film with chloroform, acetone, alcohol, and deionized water sequentially.

* * * * *